(No Model.)
C. L. WELLS.
INCUBATOR.
No. 351,729. Patented Oct. 26, 1886.
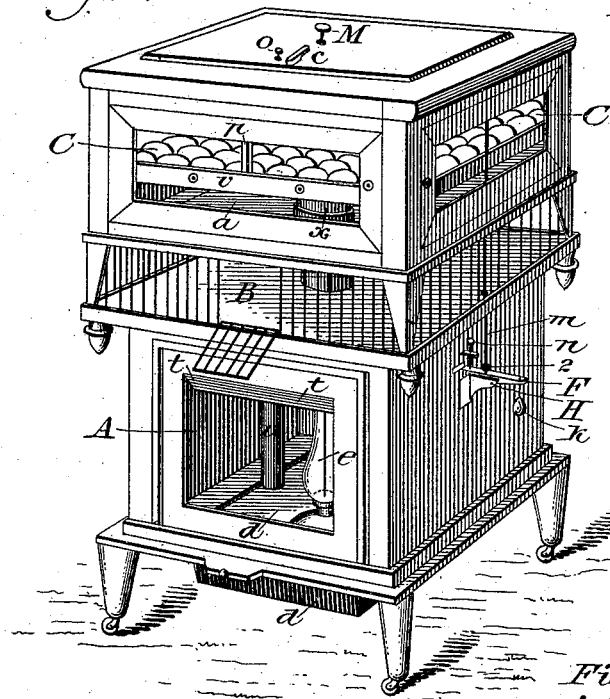
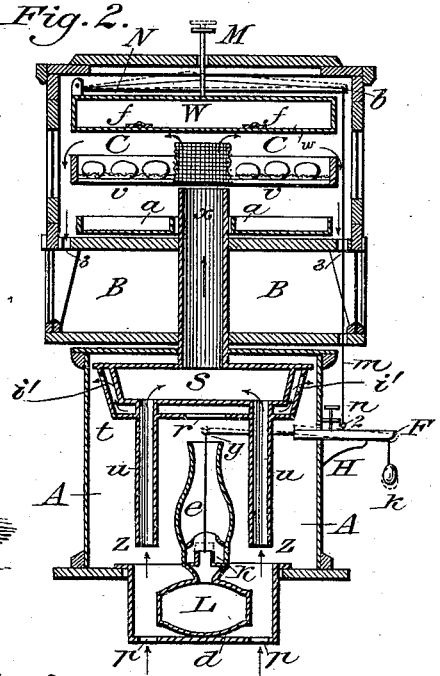
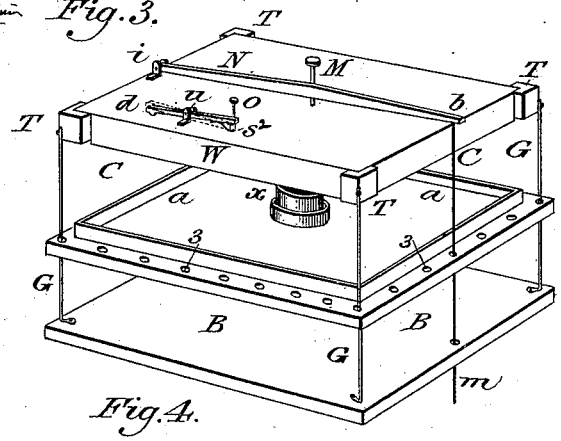
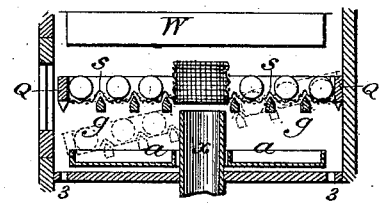
Witnesses:
Raphael E Letton
Francis W. Lyford
Inventor:
Clarence L. Wells

UNITED STATES PATENT OFFICE.

CLARENCE L. WELLS, OF QUINCY, ILLINOIS, ASSIGNOR OF ONE-HALF TO RAPHAEL E. LETTON, OF SAME PLACE.

INCUBATOR.

SPECIFICATION forming part of Letters Patent No. 351,729, dated October 26, 1886.

Application filed March 5, 1886. Serial No. 194,176. (No model.)

*To all whom it may concern:*

Be it known that I, CLARENCE L. WELLS, of Quincy, in the county of Adams and State of Illinois, have invented a new and useful Improvement in Incubators, of which the following is a specification.

This invention is an improved incubator; and it consists in certain features of construction and novel combinations of parts, as will be described.

In the drawings, Figure 1 is a perspective view, and Fig. 2 is a vertical section of my incubator. Fig. 3 is a detail perspective view, parts being removed, of the upper portion of the device. Fig. 4 is a detached sectional view showing the egg-tray, and Fig. 5 is a detail view showing the flame-reducing tube.

My device is shown consisting of a lower or heating section, A, an intermediate or brooder section, B, and an upper or tray section, C, arranged in the order specified. A drawer, $d$, is provided in the lower section, in which to support the heating device, which in the present instance is a lamp, L, as shown. In the upper part of section A, I arrange air-drum S, having an upwardly-extended flue, $x$, and a depending tube or tubes, $u$, the former, $x$, extending through section B and opening into section C, and the tube or tubes $u$ opening into section A. This drum has a supplemental bottom, $t$, slightly separated from it, to form an air-space, and provided with a central opening or inlet, $r$, and outlet or outlets $i'$. The heat passes through opening $r$, circulates around the drum proper, and passes out of outlets $i'$. The heat striking said drum causes the air therein to rise, producing a draft, drawing the air up through tubes $u$ into the drum, and thence through flue $x$ into the tray-chamber, where it strikes against a diaphragm or plate, $w$, which serves as a deflector, directing the heat outward over the eggs in the tray and causing heat to act equally on said eggs. The air in passing through the drum is heated, as will be seen.

In the bottom of the tray-section I arrange a pan, $a$, to contain water, and above such pan I arrange the egg-tray, as shown, or trays, as may be desired.

The tray Q comprises a frame, $v$, having slats $g$, over which a wire-netting, $s$, is passed. This netting is depressed between the slats $g$, forming pockets by which to prevent the eggs from rolling when the tray is tilted, as shown in dotted lines, Fig. 4. At its center, in line with the flue $x$, the tray has an upwardly-extended tubular shield, $s'$, preferably an extension of netting, $s$, as shown. This shield serves to prevent the hatched chick from getting over the ascending column of heated air. Exit parts 3 lead out of section C, through which the heated air discharges.

The brooder is suitably inclosed, and may have a door, as shown in Fig. 1, to permit access to the chicks. The flue $x$, passing through the brooder, serves to heat the same, as desired. Rods G extend from the bottom of the brooder upward through the section C, and are secured to brackets T, fixed to the plate $w$ or the device of which such plate is a part. The plate $w$ is preferably the bottom of a hollow chamber, W, having its bottom made rigid by battens or braces $f$. This chamber has an opening controlled by a valve, $d'$, pivoted at $u'$, and normally closed by a spring, $s^2$. A pin, $o$, extends upward from the valve $d'$ through the case, and may be held depressed by a button, $c$. By depressing pin $c$ the valve $d'$ may be opened to permit the escape of air from the chamber W. A lever, N, is pivoted at $i$, and extends over the chamber W, having its free end connected at $b$ with a wire, $m$, which connects it at 2 with a lever, F, having weight $k$ and adjusting-screw $n$, and an extension which connects at $y$ with a rod, $e$, bearing a sliding tube, K, which serves to adjust the size of the flame and thus regulate the heat. A set-screw, M, is threaded through lever N and bears on chamber W. A thermometer, $p$, is provided, by which the temperature of the tray-section can be ascertained.

In starting the incubator the valve $d'$ should be opened, and when the desired degree of heat is reached such valve should be closed. Then by the action of heat the expansion of the air, gas, or vapor in the chamber W will act on the lever N, and through the various connections and devices described regulate the flame as may be desired.

I do not in this application claim the thermostatic devices herein shown, as such devices are covered by me in a separate application for patent, filed May 11, 1886. Serial No. 201,873.

I claim—

1. In an incubator, the tray-section provided with trays and with outlets 3 below such trays, combined with a heater-flue leading into such section, and a plate extended above the discharge end of said flue, substantially as set forth.

2. In an incubator, the combination of the heater-section, the brooder arranged thereon, the tray-section arranged upon the brooder, and an air-passage or flue extended between the heater and tray sections and through the brooder, substantially as set forth.

3. In an incubator, the combination of the heating device, the drum S, provided with outlet-flue $x$ and inlet-tube $u$, the false bottom having opening $r$ and outlet $i'$, and the tray section or support, substantially as set forth.

4. In an incubator, a tray having a central opening, and an upwardly-extended shield surrounding the said opening, substantially as set forth.

5. An egg-tray having a central opening and a wire-netting bottom, and having such bottom extended upwardly at the center, forming a tubular shield surrounding the opening, substantially as set forth.

6. The combination of the heater-section, the tray-section, the tube or flue leading from the heater-section into the tray-section, and a plate, $w$, extended above the tray and over the discharge end of the flue, substantially as set forth.

In testimony that I claim the above I hereunto subscribe my name in presence of two witnesses.

CLARENCE L. WELLS.

Witnesses:
RAPHAEL E. LETTON,
FRANCIS WM. LYFORD.